United States Patent
Kim et al.

(10) Patent No.: US 8,301,183 B2
(45) Date of Patent: Oct. 30, 2012

(54) POWER CONTROL AND RESOURCE MANAGEMENT METHOD OF FEMTOCELL BASE STATION IN WIDEBAND WIRELESS ACCESS SYSTEM

(75) Inventors: Sung Kyung Kim, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 357 days.

(21) Appl. No.: 12/603,892

(22) Filed: Oct. 22, 2009

(65) Prior Publication Data
US 2010/0144338 A1 Jun. 10, 2010

(30) Foreign Application Priority Data
Dec. 10, 2008 (KR) .................. 10-2008-0125400

(51) Int. Cl.
H04W 4/00 (2009.01)
H04B 7/00 (2006.01)
(52) U.S. Cl. .................. 455/522; 455/443; 455/444
(58) Field of Classification Search .................. 455/443, 455/444, 445, 448, 435.2, 522
See application file for complete search history.

(56) References Cited

U.S. PATENT DOCUMENTS

| | | | |
|---|---|---|---|
| 2007/0270151 A1* | 11/2007 | Claussen et al. | 455/444 |
| 2008/0031197 A1 | 2/2008 | Wang et al. | |
| 2008/0108305 A1 | 5/2008 | Lin et al. | |
| 2008/0188265 A1 | 8/2008 | Carter et al. | |
| 2008/0227461 A1 | 9/2008 | Dayal et al. | |
| 2009/0219888 A1* | 9/2009 | Chen et al. | 370/331 |
| 2009/0286496 A1* | 11/2009 | Yavuz et al. | 455/127.1 |
| 2011/0116481 A1* | 5/2011 | Wang | 370/336 |

FOREIGN PATENT DOCUMENTS
WO 2008/015562 A2 2/2008
* cited by examiner

*Primary Examiner* — Wesley Kim
(74) *Attorney, Agent, or Firm* — Staas & Halsey LLP

(57) ABSTRACT

Provided is a power control method and resource management method of a femtocell base station in a wideband wireless access system. A macrocell base station receives received signal strength from a femtocell base station in a macrocell of the macrocell base station, compares it with received signal strength reported by a terminal in the macrocell, and when a difference between the two received signal strength is less than a threshold value, it receives received signal strength on a signal received by the terminals in the macrocell from the corresponding femtocell base station. Further, the macrocell base station determines whether the corresponding macrocell terminal is located in the coverage of the femtocell base station based on the reported received signal strength of the femtocell base station, and transmits information for controlling power of the femtocell base station or managing a radio resource to the femtocell base station according to the determination result.

10 Claims, 2 Drawing Sheets

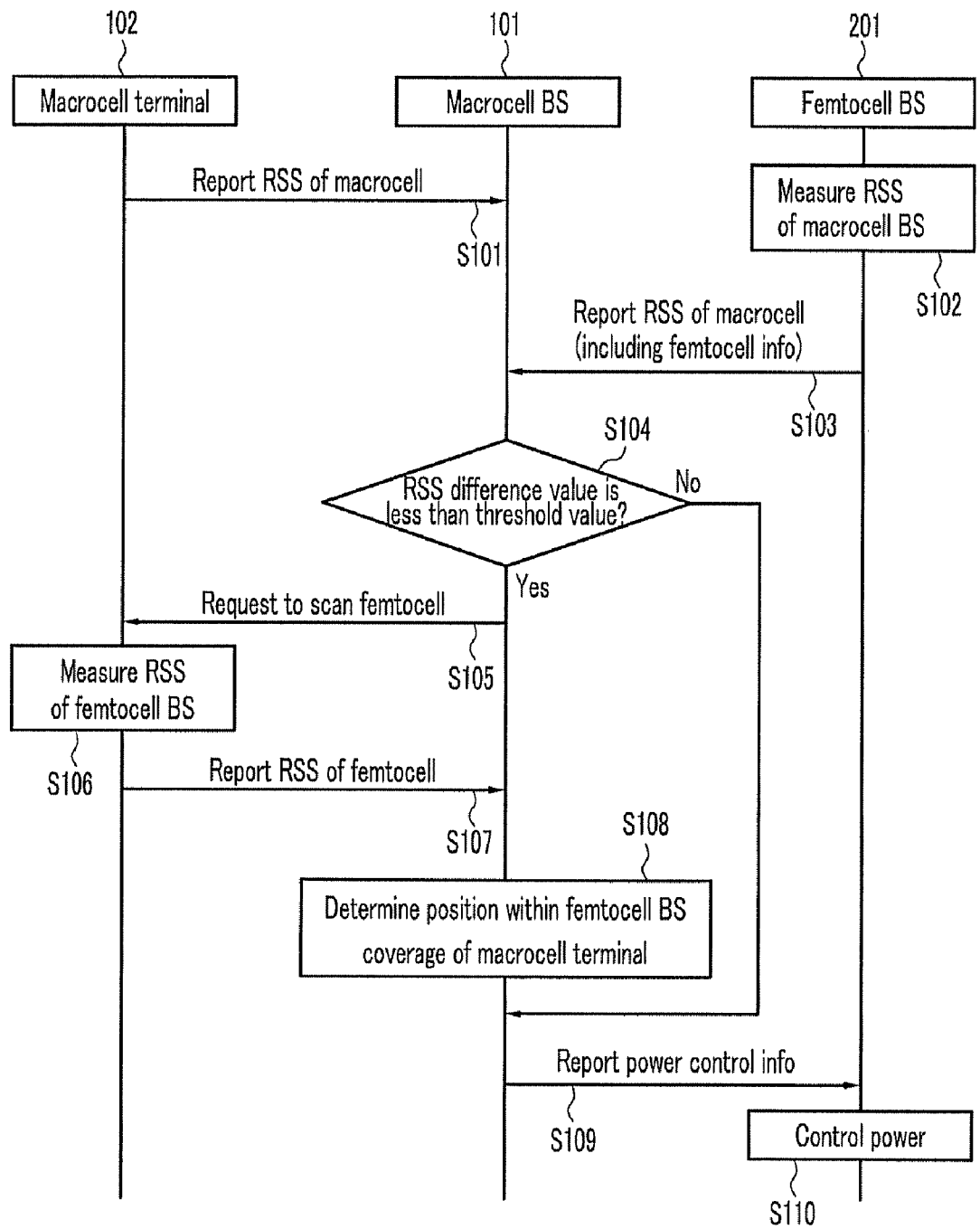

POWER CONTROL AND RESOURCE MANAGEMENT METHOD OF FEMTOCELL BASE STATION IN WIDEBAND WIRELESS ACCESS SYSTEM

CROSS-REFERENCE TO RELATED APPLICATION

This application claims priority to and the benefit of Korean Patent Application No. 10-2008-0125400 filed in the Korean Intellectual Property Office on Dec. 10, 2008, the entire contents of which are incorporated herein by reference.

BACKGROUND OF THE INVENTION (a) Field of the Invention

The present invention relates to a power control method and resource management method of a femtocell base station in a wideband wireless access system. Particularly, the present invention relates to a power control method and resource management method of a femtocell base station in a wideband wireless access system with mixed macrocells and femtocells.

(b) Description of the Related Art

Recently, the femtocell is actively studied in order to allow high-speed wireless data communication in the home or offices. Very small base stations targeting the femtocell are provided at a cheap price and are operable by the plug-and-play system.

The methods for managing the femtocell are the closed network system and the open network system. The closed network system allows the authenticated terminal to access the corresponding closed network. Therefore, the closed network system does not provide good handover, and it is required to solve the problem of interference with terminals belonging to another closed network or another open network within the coverage of the corresponding closed network.

Particularly, in order to guarantee communication of the terminals belonging to the macrocell in the femtocell, transmitted power of the femtocell base station is determined in the prior art as expressed in Equation 1.

$$P_{femto}(dB) = \min(P_{macro\text{-}rx} + L(d) + G, P_{femto\text{-}max}) \quad \text{(Equation 1)}$$

Here, $P_{macro\text{-}rx}$ is received power of a macrocell base station received by the femtocell base station, $L(d)$ is a path loss caused by femtocell coverage, and $P_{femto\text{-}max}$ is the maximum power strength transmittable by the femtocell. Also, G is a power control limit.

In Equation 1, as the femtocell base station is provided nearer the center of the macrocell, it uses greater transmitted power, and as it is provided nearer the macrocell edge, it uses lesser transmitted power. The reason of using the above-noted method is to reduce the interference applied by the femtocell base station toward the terminal belonging to the macrocell, the terminal being located on the corresponding macrocell edge. However, when the method is used, the problem of seriously deteriorating the downlink yield of the femtocell may occur.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power control method by a femtocell base station for reducing interference by a femtocell base station applied to a macrocell base station and a macrocell terminal on a network where macrocell base stations and femtocell base stations coexist and guaranteeing the yield of the femtocell.

An exemplary embodiment of the present invention provides a method for a femtocell base station to control power in connection with a macrocell base station in a wideband wireless access system in which macrocells and femtocells coexist including: transmitting first received signal strength on a signal provided by the macrocell base station and femtocell information including preamble information of the femtocell base station and a femtocell base station identifier to the macrocell base station; receiving power control information from the macrocell base station, the power control information being generated by comparing the first received signal strength and second received signal strength reported to the macrocell base station by a corresponding macrocell terminal, and the second received signal strength being measured by the macrocell terminal based on a signal provided by the macrocell base station; and controlling transmitted power based on the power control information.

Another embodiment of the present invention provides a method for a macrocell base station to control power of a femtocell base station located in a macrocell of the macrocell base station in a wideband wireless access system in which macrocells and femtocells coexist including: receiving first received signal strength on a signal provided by the macrocell base station and femtocell information from the femtocell base station; calculating a difference value between the first received signal strength and second received signal strength measured by the macrocell terminal in the macrocell by using a signal provided by the macrocell base station; when the difference value is less than a threshold value, receiving third received signal strength measured by the macrocell terminal by using a signal provided by the femtocell base station from the macrocell terminal; determining whether the macrocell terminal is located in the coverage of the femtocell base station based on the third received signal strength; and transmitting power control information for controlling power of the femtocell base station to the femtocell base station based on the determination result.

Yet another embodiment of the present invention provides a method for a femtocell base station and a macrocell base station in cooperation with each other to control a radio resource in a wideband wireless access system in which macrocells and femtocells coexist including: the femtocell base station transmitting first received signal strength on a signal provided by the macrocell base station and femtocell information including preamble information and femtocell base station identifier of the femtocell base station to the macrocell base station; the macrocell base station transmitting control information generated based on at least one of a difference value between the first received signal strength and second received signal strength measured by a corresponding macrocell terminal by using a signal provided by the femtocell base station, and third received signal strength measured by the macrocell terminal by using a signal provided by the femtocell base station to the femtocell base station; and the femtocell base station determining whether to use a specific radio resource agreed in advance with the macrocell base station based on the control information.

BRIEF DESCRIPTION OF THE DRAWINGS

FIG. 2 shows a flowchart of a method for a femtocell base station to control power according to an exemplary embodiment of the present invention.

DETAILED DESCRIPTION OF THE EMBODIMENTS

Figure 1:
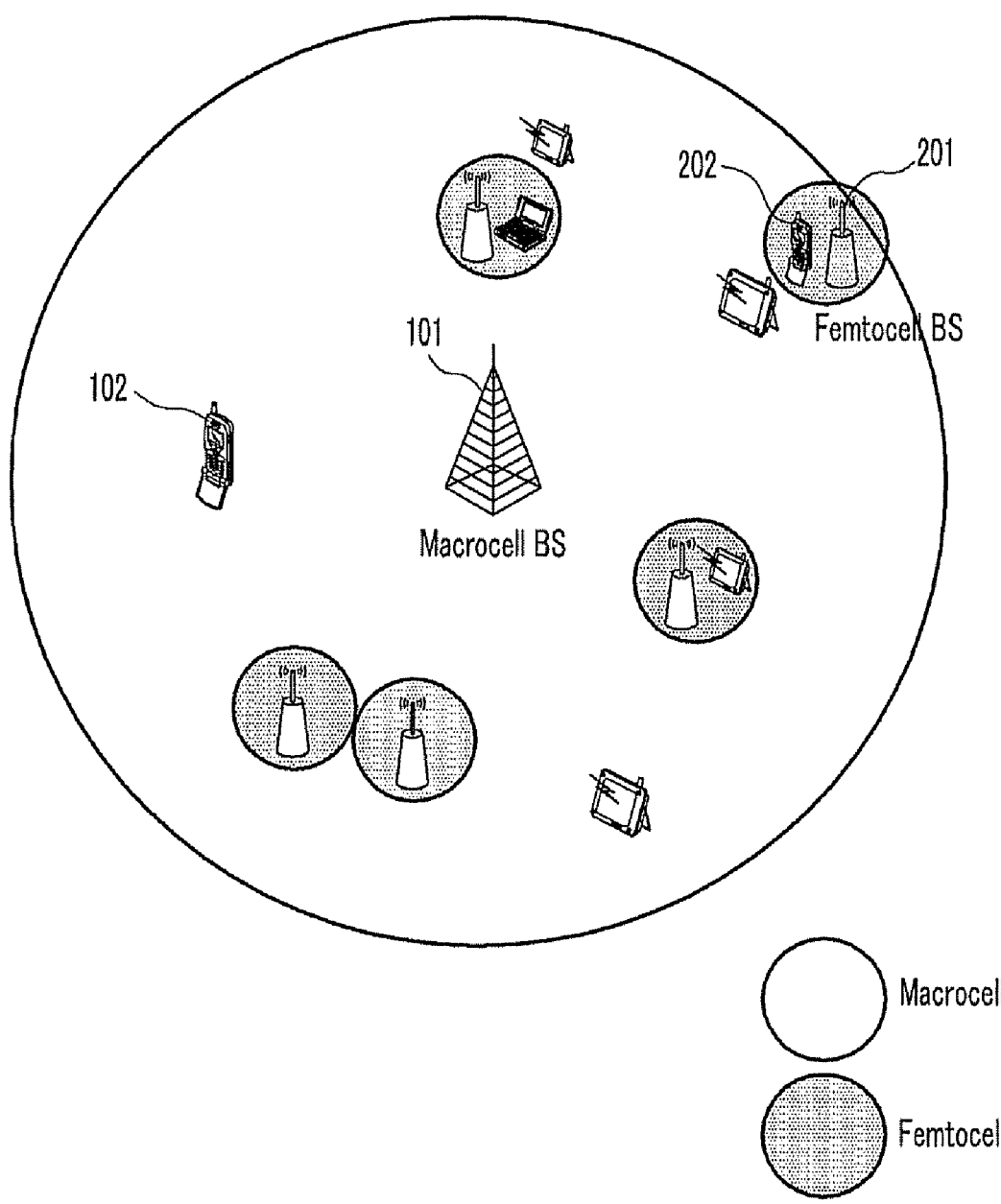
FIG. 1 shows a configuration diagram of a wideband wireless access system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification, Throughout the specification, unless explicitly described to the contrary, the word "comprise" and variations such as "comprises" or "comprising", will be understood to imply the inclusion of stated elements but not the exclusion of any other elements.

In the specification, a terminal may indicate a mobile station (MS), a mobile terminal (MT), a subscriber station (SS), a portable subscriber station (PSS), user equipment (UE), or an access terminal (AT), and it may include entire or partial functions of the terminal, the mobile terminal, the subscriber station, the portable subscriber station, the user equipment, and the access terminal.

In the specification, a base station (BS) may indicate an access point (AP), a radio access station (RAS), a nodeB (Node-B), an evolved Node-B (eNB), a base transceiver station (BTS), and a mobile multihop relay (MMR)-BS, and it may include entire or partial functions of the access point, the radio access station, the nodeB, the evolved Node-B, the base transceiver station, and the mobile multihop relay-BS.

A power control method of a femtocell base station in a wideband wireless access system in which macrocells and femtocell coexist will now be described with reference to accompanying drawings.

A terminal belonging to a macrocell will be referred to as a macrocell terminal, and a terminal belonging to a femtocell will be called a femtocell terminal. In addition, a base station covering a macrocell will be referred to as a macrocell base station, and a base station covering a femtocell will be called a femtocell base station.

FIG. 1 shows a configuration diagram of a wideband wireless access system according to an exemplary embodiment of the present invention, illustrating a case in which macrocells and femtocell coexist. FIG. 2 shows a flowchart of a method for a femtocell base station to control power according to an exemplary embodiment of the present invention.

Referring to FIG. 2, the macrocell base station 101 periodically receives received signal strength from the macrocell terminals 102 covered by the macrocell base station 101 (S101). Here, the macrocell terminal 102 periodically receives a preamble from the macrocell base station 101 and reports received signal strength to the corresponding macrocell base station 101. The received signal strength represents power present in a received preamble such as a preamble and may be called "RSS".

Further, as shown in FIG. 1, the femtocell base station 201 installed in the macrocell mixed with the femtocell measures received signal strength on the signal provided by the adjacent macrocell base station 101 (S102), and reports a measured result to the corresponding macrocell base station 101 (S103). In this instance, the femtocell base station 201 transmits corresponding femtocell information (preamble information, segment index, and femtocell base station identifier) together with the received signal strength of the adjacent macrocell base station 101 to the corresponding macrocell base station 101 through a cable backbone network or a wireless network. Here, the femtocell base station 201 can either measure the received signal strength on the signal provided by the adjacent macrocell base station 101, or use the received signal strength that is measured by the terminal 202 belonging to the corresponding femtocell by using the signal provided by the macrocell base station 101. That is, the femtocell terminal 202 measures a preamble of the macrocell base station 101 and reports it to the femtocell base station 201, and the femtocell base station 201 uses it and reports it to the macrocell base station 101.

The macrocell base station 101 stores the corresponding femtocell information together with the received signal strength reported by the femtocell base station 201, and compares the difference value between the received signal strength reported by the femtocell base station 201 and the received signal strength reported by the macrocell terminal 102 to a threshold value (S104).

When the difference value between the two received signal strength is less than the threshold value, the macrocell base station 101 transmits femtocell information of the corresponding femtocell base station 201 to the terminals 102 in the macrocell of the macrocell base station 101 to request to scan the corresponding femtocell (S105). That is, it request a report on the received signal strength for the signal provided by the corresponding femtocell base station 201

Accordingly, the macrocell terminals 102 measures received signal strength of the corresponding femtocell base station 201 by using a preamble or a frame provided by the corresponding femtocell base station 201 based on the received femtocell information, and reports it to the macrocell base station 101 (S106 and S107).

Upon receiving the same, the macrocell base station 101 determines whether the macrocell terminal 102 is located in the coverage by the femtocell base station 201 based on the received signal strength of the femtocell base station 201 (S108). That is, the macrocell base station 101 determines whether the corresponding macrocell terminal 102 is located in the coverage of the femtocell base station 201 by using the received signal strength of the femtocell base station 201 reported by the macrocell terminal 102. The macrocell base station 101 transmits power control information including the state whether the macrocell terminal 102 is located in the coverage of the femtocell base station 201 and the difference value between received signal strength of the femtocell base station 201 reported by the macrocell terminal 102 and received signal strength of the macrocell base station 101 reported by the macrocell terminal 102 and the femtocell base station 201 to the femtocell base station 201 (S109).

Accordingly, the femtocell base station 201 controls power of the femtocell base station 201 based on the power control information provided by the macrocell base station 101 (S110). That is, when the macrocell terminal 102 is located in the coverage of the femtocell base station 201, the femtocell base station 201 reduces transmitted power so as to decrease interference applied to the corresponding macrocell terminal 102. However, when the macrocell terminal 102 is located outside the coverage, the femtocell base station 201 increases transmitted power so as to increase the yield or improve communication quality.

In addition, when the difference value of the two received signal strength is greater than the threshold value in S104, the macrocell base station 101 transmits the power control information including the difference value between the received signal strength of the macrocell base station 101 reported by the macrocell terminal 102 and the femtocell base station 201 to the femtocell base station 201 (S109). Accordingly, the femtocell base station 201 controls power of the femtocell base station 201 based on the power control information provided by the macrocell base station 101 (S110). That is, when the difference value between the two received signal strength is greater than the threshold value, the femtocell base station 201 maintains the transmitted power at a high level so as to increase the yield or improve communication quality.

The exemplary embodiment of the present invention has described the method for the femtocell base station 201 to control transmitted power so as to reduce interference applied to the macrocell terminal 102, and the method of using no specific radio resource or the method for the femtocell base station to perform a relay station function are also allowable for the present invention.

For example, when the macrocell terminal 102 is located in the coverage of the femtocell base station 201, the femtocell base station 201 reduces interference applicable to the macrocell terminal 102 by not using a specific radio resource according to a previous agreement with the macrocell base station 101. Also, when the macrocell terminal 102 is located in the coverage of the femtocell base station 201, the femtocell base station 201 can transmit the downlink data provided by the macrocell base station 101 through the wireless network or the backbone network to the macrocell terminal 102.

According to the embodiments of the present invention, interference by the femtocell base station applied to the macrocell terminal in the wideband wireless access system where macrocells and femtocells coexist is minimized, and the yield of the femtocell is efficiently increased.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a femtocell base station to control power in connection with a macrocell base station in a wideband wireless access system in which macrocells and femtocells coexist comprising:
   transmitting first received signal strength on a signal provided by the macrocell base station and femtocell information including preamble information of the femtocell base station and a femtocell base station identifier to the macrocell base station;
   receiving power control information from the macrocell base station, the power control information being generated by comparing the first received signal strength and second received signal strength reported to the macrocell base station by a corresponding macrocell terminal, and the second received signal strength being measured by the macrocell terminal based on a signal provided by the macrocell base station; and
   controlling transmitted power based on the power control information, wherein
   when a difference value between the first received signal strength and the second received signal strength is less than a threshold value, the macrocell base station determines whether the macrocell terminal is located in the coverage of the femtocell base station based on third received signal strength of the femtocell base station measured by the macrocell terminal by using a signal provided by the femtocell base station, and includes a determination result in the power control information.

2. The method of claim 1, wherein
   the controlling of transmitted power includes
   reducing the transmitted power when the macrocell terminal is located in the coverage of the femtocell base station.

3. A method for a macrocell base station to control power of a femtocell base station located in a macrocell of the macrocell base station in a wideband wireless access system in which macrocells and femtocells coexist comprising:
   receiving first received signal strength on a signal provided by the macrocell base station and femtocell information from the femtocell base station;
   calculating a difference value between the first received signal strength and second received signal strength measured by the macrocell terminal in the macrocell by using a signal provided by the macrocell base station;
   when the difference value is less than a threshold value, receiving third received signal strength measured by the macrocell terminal by using a signal provided by the femtocell base station from the macrocell terminal;
   determining whether the macrocell terminal is located in the coverage of the femtocell base station based on the third received signal strength; and
   transmitting power control information for controlling power of the femtocell base station to the femtocell base station based on the determination result.

4. The method of claim 3, wherein
   the receiving of third received signal strength includes
   requesting the macrocell terminal to scan the femtocell base station by transmitting the femtocell information including preamble information and femtocell base station identifier of the femtocell base station to the macrocell terminal; and
   receiving the third received signal strength acquired by the macrocell terminal by performing scanning based on the femtocell information.

5. The method of claim 3, wherein
   the power control information includes the difference value or the third received signal strength.

6. The method of claim 3, further including,
   when the difference value is greater than the threshold value,
   transmitting power control information including the difference value to the femtocell base station.

7. A method for a femtocell base station and a macrocell base station in cooperation with each other to control a radio resource in a wideband wireless access system in which macrocells and femtocells coexist comprising:
   the femtocell base station transmitting first received signal strength on a signal provided by the macrocell base station and femtocell information including preamble information and femtocell base station identifier of the femtocell base station to the macrocell base station;
   the macrocell base station transmitting control information generated based on at least one of a difference value between the first received signal strength and second received signal strength measured by a corresponding macrocell terminal by using a signal provided by the femtocell base station, and third received signal strength measured by the macrocell terminal by using a signal provided by the femtocell base station to the femtocell base station; and the femtocell base station determining whether to use a specific radio resource agreed in advance with the macrocell base station based on the control information.

8. The method of claim 7, wherein the transmitting to the femtocell base station includes the macrocell base station receiving a report on the third received signal strength from the macrocell terminal when the difference value is less than a threshold value.

9. The method of claim 8, wherein the transmitting to the femtocell base station further includes the macrocell base station determining whether the macrocell terminal is located in the coverage of the femtocell base station based on the third received signal strength; and the macrocell base station generating the control information based on the determination result.

10. The method of claim 7, wherein the determining includes using no specific radio resource when the control information corresponds to the case in which the macrocell terminal is located in the coverage of the femtocell base station.

* * * * *